United States Patent [19]

Buhler et al.

[11] Patent Number: 4,900,889
[45] Date of Patent: Feb. 13, 1990

[54] CURRENT SUPPLY DEVICE FOR MOVABLE ELECTRODES OF SPARK EROSION MACHINES

[75] Inventors: Ernst Buhler, Losone; Peter Wehrli, Versico; Massimo Martignoni, Lumino; Mauro Erba, Locarno, all of Switzerland

[73] Assignee: Ag fur Elektronik Industrielle, AGIE, Losone bei Locarno, Switzerland

[21] Appl. No.: 311,170

[22] Filed: Feb. 15, 1989

[30] Foreign Application Priority Data

Feb. 16, 1988 [DE] Fed. Rep. of Germany ....... 3804811

[51] Int. Cl.⁴ .......................... B23H 7/10; B23H 7/04
[52] U.S. Cl. ................................ 219/69.12; 219/69.13
[58] Field of Search .......................... 219/69.12, 69.13

[56] References Cited

U.S. PATENT DOCUMENTS 4,575,605  3/1986  Martin ............................... 219/69.12

FOREIGN PATENT DOCUMENTS 61-56828   3/1986  Japan .
236430    10/1986  Japan ............................... 219/69.13
236433    10/1986  Japan ............................... 219/69.13
62-88518   4/1987  Japan .

Primary Examiner—A. D. Pellinen
Assistant Examiner—Geoffrey S. Evans
Attorney, Agent, or Firm—Helfgott & Karas

[57] ABSTRACT

A current supply device for movable electrodes of spark erosion machines comprises a plurality of individual contacts and includes in leads connecting the contacts with a current generator, electrical components in the form of pulse transformers for a pairwise negative feedback of partial currents or additional impedances stepped according to a mathematical series for uniform current distribution over the individual contacts. The current supply device is particularly suitable for the current transmission of high energy short pulses, such as are used for an erosive wire cutting. The current supply device operates in an almost wear-free manner and can also fulfill the function of guide for the electrode.

17 Claims, 3 Drawing Sheets

CURRENT SUPPLY DEVICE FOR MOVABLE ELECTRODES OF SPARK EROSION MACHINES

BACKGROUND OF THE INVENTION

The present invention relates to a current supply device for movable electrodes, particularly running wire electrodes of spark erosion machines.

For spark erosive machining and allied processes, ever higher pulse energies are used, which leads to unacceptably short current supply element life periods. As a result of the high current loading of the current supply elements, a material abrasion takes place, which causes executive wear of current supply elements.

In the case of wire erosion machines the current is fed to the wire electrode normally by means of two current supply elements, one being positioned above and the other below the workpiece. DE-OS 26 53 857 (corresponding to U.S. Pat. No. 4,205,212 has already proposed using two or more current supply elements for each workpiece side, as well as constructing the pulse generator (current source) in a two-channel manner, to improve the current distribution. JP-OS 62-34724 discloses a current supply device with at least two contacts and two generator channels, a higher voltage being applied to the contact more remote from the workpiece.

JP-OS 61-236433 also discloses several successively arranged current supply contacts, the contacts closer to the workpiece being in each case wired to a diode, in order to achieve a better current distribution.

However, all these measures have failed to lead to desired results. Thus, use is now made of multiply usable, single current supply elements, which have to be moved or turned after every couple of hours in operation. This will not be acceptable in future in the case of automatic longterm use of installations. A multi-channel construction of the pulse generators is very costly, particularly if the polarity of the pulses has to be reversed for special machining operations. Modern pulse generators, like those described e.g. in DE-OS 36 39 256, produce pulse currents up to 1000A. Thus, an unnecessary pulse loss capacity of 1 KW is produced per volt of unnecessarily present voltage drop. The two aforementioned Japanese specifications were unable to solve this problem, because the voltage drops produced along the electrode due to the pulse current are of an ohmic and inductive nature. Thus, they are dependent on the pulse current, its derivation after time and the ohmic and inductive components of the electrode. Thus, the voltage drops are not constant, so that the very idea of compensating them with constant voltages is wrong from the outset.

SUMMARY OF THE INVENTION

It is an object of the present invention to provide an improved power supply device.

It is another object of this invention to provide a power supply device which has a much longer service life.

These and other objects of the present invention are attained by a current supply device for movable electrodes of spark erosion machines, which comprises lead means connecting current supply contacts to a current supply source and means arranged in the lead means and dimensioned and wired in such a way that the partial currents fed in at individual current supply contacts are of the same magnitude.

The inventive measures lead to a very uniform current distribution, i.e., the current loading of the individual current supply contacts can be very uniform and adjusted in such a way that there would be no significant wear as a result of the electrical loading. Thus, in extreme cases, the service life of the current supply contacts can reach that of the actual machine. There is no need to construct the pulse generators in multi-channel form. For certain purposes it is readily possible to work with two-channel pulse generators. The invention also leads to a very high current transmission efficiency. Further advantages of the invention are that it is no longer necessary to displace or turn the current supply elements at short intervals or even replace the same, the construction and cabling of the pulse generator are simple and less expensive and the pulse transmission efficiency can be improved.

In the case of an optimum design of the current supply device it is even possible to realize an old dream, namely that of simultaneously using the current supply device as the electrode guide element, which leads to the additional advantage that the current supply is closer to the working zone by the electrode guide distance gained, which prevents considerable power losses.

The aforementioned objects, features and advantages of the invention will, in part, be pointed out with particularity, and will, in part, become obvious from the following more detailed description of the invention, taken in conjunction with the accompanying drawing, which form an integral part thereof.

DETAILED DESCRIPTION OF THE PREFERRED EMBODIMENTS

Figure 1:
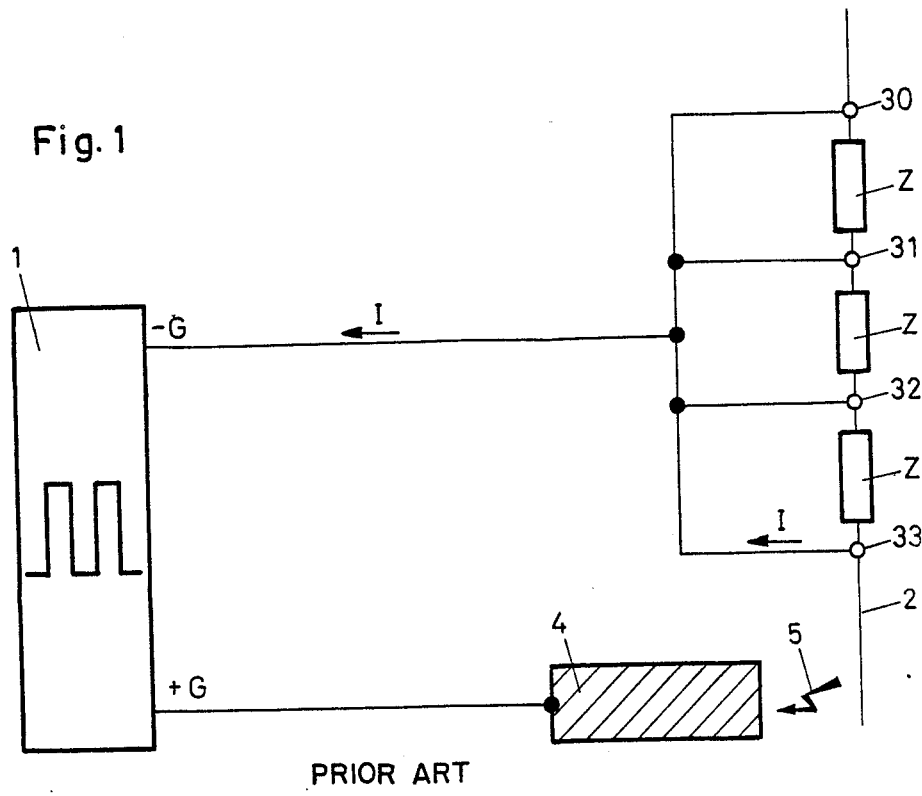
FIG. 1 is an electric circuit diagram for four short-circuited individual contacts of the prior art.

FIG. 1 shows a circuit diagram of the current supply device with the disadvantages of the multiple current supplies without the compensation according to the present invention. Across its output terminals $-G$ and $+G$, a cable 39, a distributor 38 and leads 34, 35, 36 and 37, a pulse generator 1 supplies machining pulses to individual contacts 30, 31, 32 and 33, which are in the form of sliding contacts, along which slides a running wire electrode 2. The by-no-means negligible ohmic and inductive components of the electrode between the individual contacts 30, 31, 32 and 33 are represented by impedances Z. It is immediately possible to see the effect of this arrangement. The pulse current of output terminal $-G$ is theoretically concentrated solely on the bottom individual contact 33. As the individual contacts are reciprocally short-circuited via the distributor 38 and in general have negligible self-impedances, the impedances Z, between the individual contacts 30 to 33 act in the manner of current dividers with a short-circuit. The natural consequence is that the total pulse current commutates on the short-circuit path, i.e. on the individual contact 33 closest to the working zone 5. This not only applies in the case of multiple contacts with discrete individual contacts. Even in the case of large-area single contacts, it is found that the part of the bearing surface between the contact and the electrode which is closer to the working zone is always destroyed. If a critical pulse current value per contact of approximately 200A is exceeded, no materials are at present known, which are not melted or even evaporated by purely ohmic overheating at the usually microscopically small contact point. However, the high pulse currents are required precisely for this reason, namely in order to eliminate short-circuits between workpiece 4 and electrode 2 in the microsecond range by material evaporation.

However, as a result of the invention, a very uniform current distribution on the individual contacts is obtained, so that the pulse level per contact can be kept below the critical value, whilst still achieving the desired very high pulse currents in working zone 5. As a result of the inventive measures, there is an almost perfect distribution of the pulse current over harmless values. No measurable wear could be detected in 100 hour tests, whereas it is typically approximately 300 μm in the case of the arrangement according to FIG. I.

Figure 2:
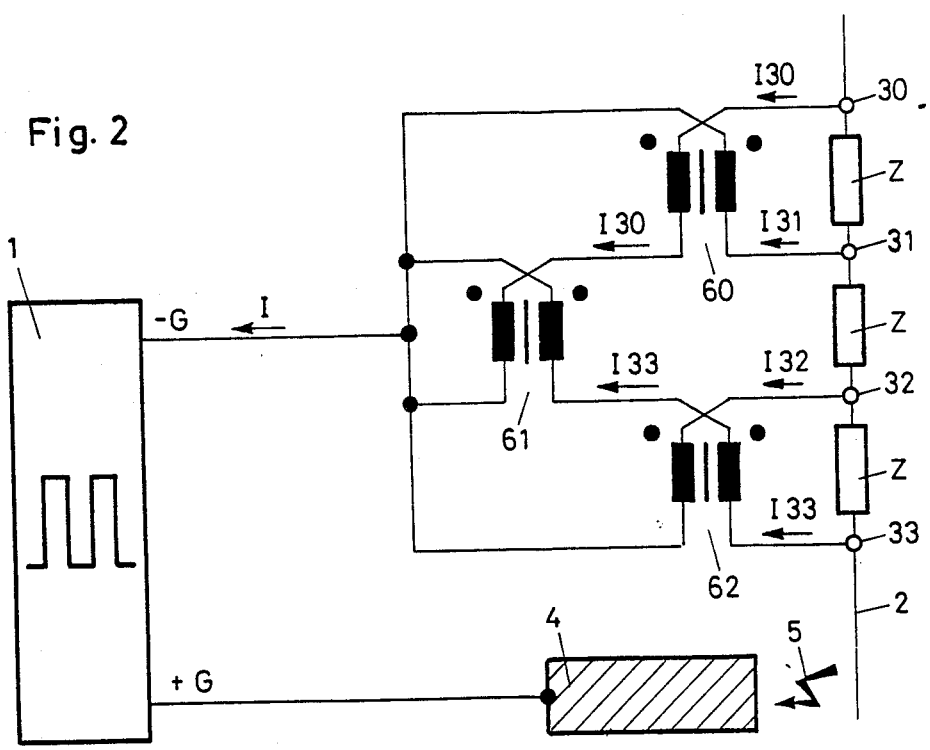
FIG. 2 is a circuit diagram of a first embodiment of the invention, with a uniform current distribution resulting from the pairwise inductive negative feedback of the partial currents.

FIG. 2 shows a first embodiment of the invention, which is suitable for high energy short pulses, because apart from the voltage drops present in the electrode 2 (single impedances Z), it produces no additional losses. Pulse transformers 60, 61 and 62 are connected in leads 34, 35, 36 and 37, i.e. between the individual supply contacts 30, 31, 32, 33 and the distributor 38 or output −G of the pulse generator 1. If a uniform distribution of the partial currents is sought, then pulse transformers 60, 61, 62 are wound in the ratio 1:1. Other transmission ratios can be useful in special cases. The individual windings of the transformers are so connected in the leads that partial currents 130 to 133 of adjacent current supply contacts are always linked according to the transformer principle. The transformers are also connected in such a way that the partial currents flowing through one transformer in each case are guided in the opposite direction through the core, so that their magnetic fluxes are compensated for if the currents are of the same magnitude, otherwise a compensation voltage is induced. The arrangement and wiring of the pulse transformers 60, 61 and 62 in FIG. 2 is one of the many possibilities. The decisive point is that all the partial currents 130 to 133 are in some way counter-coupled with one another and in the present example it is the counter-coupling of currents 130 with 131, 130 with 133 and finally 133 with 132, respectively.

Assuming that a normal 0.25 mm brass 63 wire serves as electrode 2, the pulse current I has an amplitude of 500A, and a derivation according to time of 500A/μ and the distances between the individual contacts 30 to 33 is in each case 5 mm, the impedances Z become approximately 7 mΩ resistive and 5 nano-Henry inductive. A peak loss capacity of 1.5 KW is to be expected across the impedances Z and between the individual contacts 32, 33 a resistive voltage drop of 3 V and an inductive voltage drop of 2 V, which typically leads to a voltage drop of 3.6 V. This makes it clear that the pulse transformer 62 with a necessary voltage time surface of a few μVs can be made very small. It is generally sufficient to apply in each case one winding to an approximate diameter 15 mm highly permeable ferrite ring. The stressing to the remaining pulse transformers 60, 61 is even smaller.

For the pulse current I, pulse transformers 60, 61 and 62 interfere in no way, because they only act differentially. It is to be pointed out that this variant could also be used for multi-channel machining by means of a monochannel generator.

Figure 3:
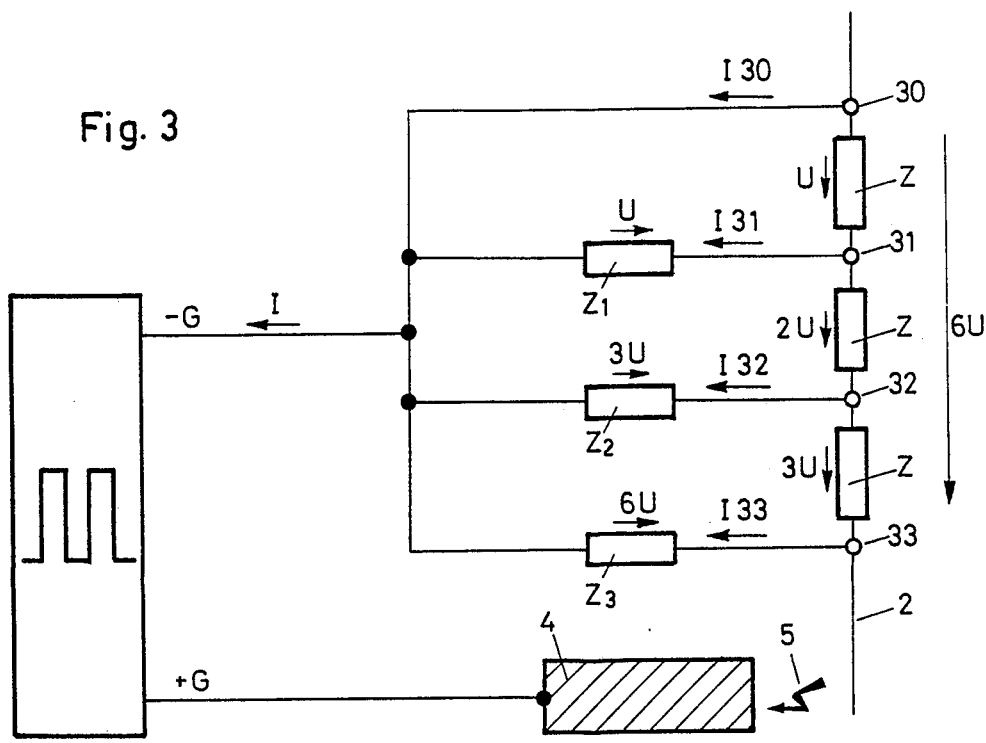
FIG. 3 is a circuit diagram of a second embodiment of the invention with matched impedances for each individual contact.

FIG. 3 shows a second embodiment of the current supply device with matched additional impedances Z1, Z2, Z3. Thus in each lead 35, 36, 37 is connected an additional impedance Z1, Z2 or Z3, whilst no additional impedance is connected in the lead 34 furthest from the Working zone. Although the additional impedances Z1, Z2 and Z3 being additional losses of approximately 70% of the losses occurring in impedances Z of electrode 2, this disadvantage is more than outweighed by the usability of this variant for long pulses and even for direct current, as well as for interesting possibilities discussed hereinafter.

Only the partial current I30 flows through the impedance Z between individual contacts 31 and 30. The voltage drop at said impedance is then U. It is now required that all the partial currents I30, I31, I32 and I33 are the same. Thus, a current corresponding to I30 + I31 flows over this area between individual contacts 32 and 31. Thus, the voltage drop in this area is 2U. Correspondingly in the area between the individual contacts 31 and 32 the voltage drop is 3U. In the case of n successively connected individual contacts, the voltage drop between the individual contacts n and n−1 is n−1 ·U. As the sum of the mesh voltages is always zero, in the case of an ideal current distribution, i.e. if all the partial currents are equal, the voltage drop in impedance Z1 must be equal to U, the voltage drop in impedance Z2 equal to 3U and that in impedance Z3 equal to 6U. This shows the incorrectness of the measure provided in the aforementioned Japanese specifications of wishing to obtain a favorable current distribution with constant voltage drops.

For a random number of partial contacts 30 ... $n_{max}$, for the individual impedances Z1, Z2, Z3 ... Zn, a step system according to an infinite series is obtained, namely 1, 3, 6, 10, 15, 21, 28, 36, 45, 55, 66, etc. or expressed in more general terms:

$$Zn = Z(n-1) + Z_1 \cdot n$$

in which n is the individual contact number and $Z_n$ the additional impedance of the nth partial contact. $Z_{10}$ becomes zero and Z1 must at least approximately correspond to the impedance Z between two partial contacts 30–33.

The additional impedances Z1, Z2, Z3 can be realized in the most varied ways. One possibility is to match the cross-section and/or length of the leads to the individual contacts 30–33. Another possibility is to design the individual contacts 30–33 as impedances Z1, Z2, Z3.

Figure 4:
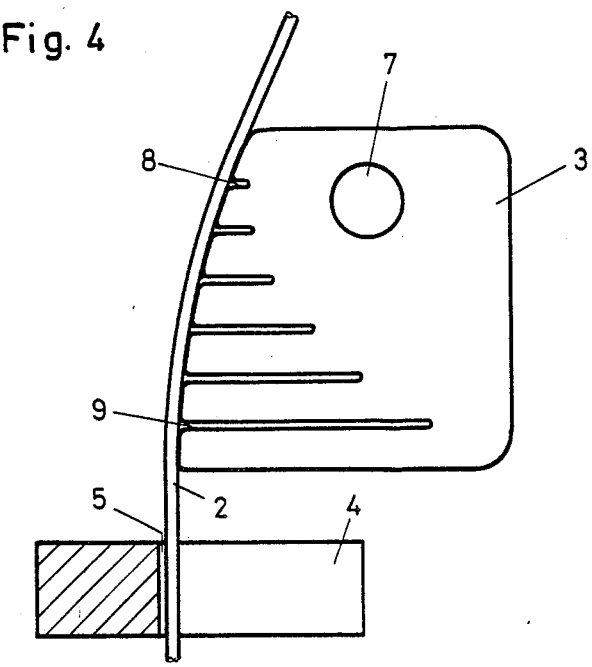
FIG. 4 is a schematic view of a device for the multiple current supply with matched impedances, which can be made from one piece.

FIG. 4 shows an example for the latter variant, in which a multiple current contact 3 is formed from a millimeter thin disk. In the longitudinal direction of the contact line with the electrode 2, slits 8, 9 are made from the contact line in such a way that a comb-like structure is obtained with teeth lengthened towards the working zone and which in each case form an individual contact. As a result of the different length of the teeth, they also have different impedance values in accordance with the desired step system. The slits need not pass completely through, in order to eliminate vibration problems in the case of longer individual contacts. Thus, it is merely a question of influencing the local conductivity in the material in such a way that the additional impedances Z1, Z2, Z3, etc. are formed. The slits 8, 9 can be subsequently closed again with a poorly conducting filler. A bore 7 in FIG. 4 is used for connection to the output terminal −G of pulse generator 1.

There should be the maximum number of individual contacts. A lower limit is represented by roughly four individual contacts. The higher the upper limit, the lower and therefore the safer can be fixed the currents to be transmitted per individual contact. Laminates are now being developed, which are only conductive in the direction of the layer, but are insulating at right angles thereto, the layer thicknesses being smaller than 1 μm. Through corresponding shaping, such a material could also be very suitable for current transfer purposes. Over 1000 individual contacts with associated impedance Zn would be formed for each mm of contact length. The material choice is very important. In part contradictory characteristics are required. On the one hand a very good conductivity would be advantageous in the case of current emission against electrode 2, in order to reduce Joule's heat ($I^2 \cdot R$), but on the other hand a low conductance is desired in order to be able to realize the additional impedances Z1, Z2, Z3, etc. with small lengths, but large cross-sections. At the contact points with respect to the electrode, the material must also be very hard and have good sliding characteristics in conjunction with the electrode material. These characteristics can also be locally modified following machining, e.g. by applying thin coatings. Good possibilities are provided by conductive ceramics which have been available only for a short time such Ti (CN)-Ti $B_2$ (titanium boride) Ti (CN)-$Cr_3C_2$, $Si_3N_4$ (silicon nitride) and $Si_3N_4$-$Al_2O_3$ (Sialon). A large number of such materials exists, which as a result of the impurity (dopant) being introduced in a precisely dosed manner have a selectable conductivity, which is based on ion migration. The possibility also exists to start with a weakly doped basic material and then by planned diffusion with the corresponding impurity, to subsequently increase the conductivity on the surface, similar to the process used in semiconductor production.

Figure 5:
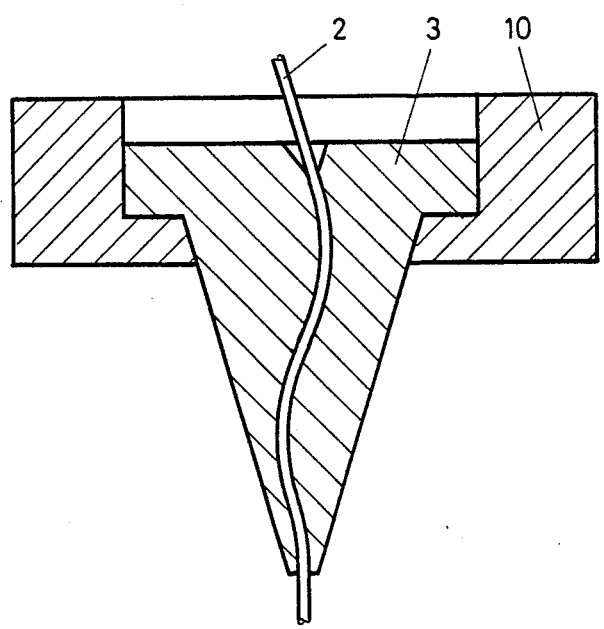
FIG. 5 is a sectional view through another embodiment with a rotationally symmetrical current supply with helical contact line.

FIG. 5 shows an embodiment of the invention, where even greater account is taken of the possibilities of conductive ceramics and in which the number of individual contacts tends towards infinity. There is fundamentally no reason why the number of individual contacts should not tend towards infinity, provided that a uniform current distribution is ensured. The higher the number of individual contacts, the lower can be the current loading per individual contact, if a specific current is to be fed in (e.g. 100A). If the number of individual contacts tends towards infinity, then the current loading per individual contact tends towards zero. An increase in the number of individual contacts is obtained by providing an uninterrupted, longer contact line between a multiple contact 3 and the electrode 2. If this line is long enough, then the comparatively small conductivities of ceramics are adequate. A uniform current distribution is obtained over a planned cross-sectional change in decreasing manner towards the working zone. A numerical calculation of the necessary cross-section is not very simple, because the current flow in the ceramic takes place spatially. However, through the finite element method, it is possible with the aid of a computer to determine the optimum shape of the multiple contact 3 according to FIG. 5. In principle, the multiple contact is constructed in frustum-shaped manner an therefore has a cross-sectional decrease towards the working zone. Thus, the infeed of the total current takes place in the vicinity of the largest diameter, i.e. at the area of the current supply 3 remote from the working zone. Thus, the individual partial currents have varyingly long paths and cross-sections or leads, so that the lead and therefore the impedance to the "individual contact" closest to the working zone is highest.

According to another variant of the invention the contact line between electrode 2 and the current supply contact 3 is helical (FIG. 5). This leads to a particularly compact construction favorable for scavenging devices. It is easy to produce a helical bore as a result of the numerically controlled sink erosion machines available. The bore can be much larger than the diameter of electrode 2. The free cross-section of the bore can also be used for the automatic threading of the electrode 2 into a starting hole bore by means of a high pressure water jet. As the electrode is under tensile stress during machining, the helical bore also leads to force components, which are at right angles to the bore surface, so that an adequate contact pressure is produced.

As can be seen from FIG. 5, a contact ring 10 is provided for the mounting of multiple contact 3 and simultaneously serves as an electrical connection with the output terminal −G of pulse generator 1.

As the multiple contacts according to the invention are no longer subject to any significant wear, there is also no reason for providing a separate electrode guide made from sapphire or diamond. This leads to the major advantage that the multiple contact can be positioned closer to the working zone, which naturally also reduces the impedances of electrode 2 between the current supply and the working zone. This also reduces the current transmission losses.

There has been disclosed heretofore the best embodiment of the invention presently contemplated. However, it is to be understood that various changes and modifications may be made thereto without departing from the spirit of the invention.

What is claimed is:

1. A current supply device for movable electrodes of spark erosion machines, comprising a plurality of current supply contacts arranged in series in a direction of elongation of a movable electrode and connected by leads to a current supply source; and a plurality of electrical components interconnected in said leads between said current supply contacts and said current supply source, said electrical components being constructed and wired in said leads in such a way that partial currents fed in at individual current supply contacts are of the same magnitude, taking into consideration of a voltage drop along said electrode, wherein the electrical components interconnected in the leads are dimensioned so as to bring about an inductive negative feedback of the partial currents.

2. Current supply device according to claim 1, wherein the device is constructed so that it additionally assumes an electrode guidance function.

3. Current supply device according to claim 1, wherein said electrical components are pulse transformers and said leads are transformer counter-coupled on the current supply contacts in a pairwise manner by means of ferromagnetic cores of said pulse transformers.

4. Current supply device according to claim 3, wherein said transformers have ferrite ring cores and the transformer counter-coupling is obtained by means of said ferrite ring cores.

5. Current supply device according to claim 1, wherein said electrical components are impedances of such size that the voltage drops along the electrode are compensated between the individual current supply contacts.

6. Current supply device according to claim 1, wherein in the lead connected to the current supply contact which is furthest from a working zone of said electrode, no impedance is interconnected and in the leads following said furthest current supply contact are connected impedances Zn, an impedance value $Z_n$ of which complies with the following equation:

$$Z_n = Z_{(n-1)} + Z_1 \cdot n,$$

where n is the order of the current supply contact in the direction towards the working zone and Z is approximately the impedance of said electrode between two individual current supply contacts.

7. Current supply device according to claim 6, wherein individual impedances Z are formed by unequal length and unequal cross-section of the leads connected to the individual current supply contacts.

8. Current supply device according to claim 6, wherein individual impedances $Z_n$ are formed by an unequal length of the leads connected to the individual current supply contacts.

9. Current supply device according to claim 6, wherein individual impedances Zn are formed by an unequal cross-section of the leads connected to the individual current supply contacts.

10. Current supply device according to claim 6, wherein individual impedances Zn are formed by an unequal length of the individual current supply contacts.

11. Current supply device according to claim 6, wherein individual impedances Zn are formed by an unequal cross-section of the individual current supply contacts.

12. Current supply device according to claim 6, wherein the individual impedances $Z_n$ are formed by an unequal length and an unequal cross-section of the individual current supply contacts.

13. Current supply device according to claim 10, wherein the individual contacts are made of conductive ceramic.

14. Current supply device according to claim 11, wherein the individual contacts are made of conductive ceramic.

15. Current supply device according to claim 12, wherein the individual contacts are formed in a current supply plate by comb-like incisions of unequal length and spaced from each other.

16. Current supply device according to claim 12, wherein the number of individual current supply contacts provided tends towards infinity, so that on a line the electrode uniformly rests on a current supply device, different impedances being formed by a cross-sectional reduction in the direction of the working zone.

17. Current supply device according to claim 16, wherein said contacts are formed on a body of revolution conically tapering in the direction of the working zone and having a helical passage passing through an interior of said body, said electrode passing through said passage, and wherein a machining current is fed in at a larger end of said body of revolution.

* * * * *